UNITED STATES PATENT OFFICE.

EMILE GUSTAVE BOHY, OF NYON, SWITZERLAND.

MATCH.

SPECIFICATION forming part of Letters Patent No. 622,109, dated March 28, 1899.

Application filed September 22, 1898. Serial No. 691,611. (No specimens.)

*To all whom it may concern:*

Be it known that I, EMILE GUSTAVE BOHY, manufacturer, of Nyon, Switzerland, have invented certain new and useful Improvements in Matches, of which the following is a specification.

This invention consists of a match which may be of any suitable form or size whatever and the body of which may be of wood or other material, the head being formed of a mass containing a suitable quantity of hypophosphite and more especially of hypophosphite of calcium.

I will now give an example of the composition of a paste which may be used for the manufacture of matches made according to my invention.

The following is its composition: 0.2125 kilo glue, 0.030 kilo gum-tragacanth into 0.650 kilo water to be dipped twelve hours and then dissolved with the help of water-bath to 90° centigrade. Then add 0.025 kilo turpentine, 1.000 kilo chlorate of potash, 0.200 kilo sulphur, 0.150 kilo to 0.200 kilo hypophosphite of calcium, 0.005 kilo to 0.010 kilo acid chromate of potassium, 0.125 kilo to 0.150 kilo chromate of baryta, 0.200 kilo to 0.250 kilo powdered glass, 0.010 kilo color, (aniline yellow preferred.) The mixture is then milled several times and the matches dipped into the paste, while maintaining the latter at a constant temperature of 40° centigrade.

In the present improvement I prefer to use hypophosphite of calcium, as the same is cheap and can be freely used by the workmen in the manufacture of matches without any injurious effect, and in addition the match ignites more easily by friction than do the matches that have heretofore been made containing phosphorus; but I do not limit myself to hypophosphite of calcium, as a corresponding benefit is obtained by the use of any hypophosphite that I have been able to obtain.

I claim as my invention—

1. The match-paste containing a hypophosphite in addition to the materials usually employed in the paste for the heads of matches, substantially as set forth.

2. The match containing in the igniting-head hypophosphite of calcium in addition to the usual materials employed in the igniting match-head, substantially as set forth.

In testimony that I claim the foregoing as my invention I have signed my name in presence of two subscribing witnesses.

EMILE GUSTAVE BOHY. [L. S.]

Witnesses:
 E. IMER-SCHNEIDER,
 TH. IMER.